Sept. 20, 1966  S. L. ROSS  3,273,316
INDUSTRIAL WASTE GAS PURIFIER METHOD
Filed Feb. 3, 1964  3 Sheets-Sheet 3
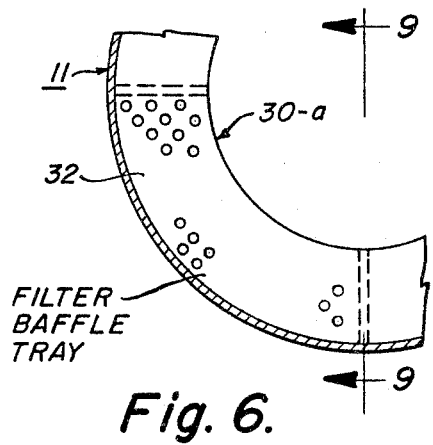
Fig. 6.
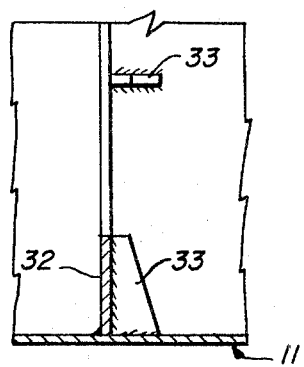
Fig. 9.
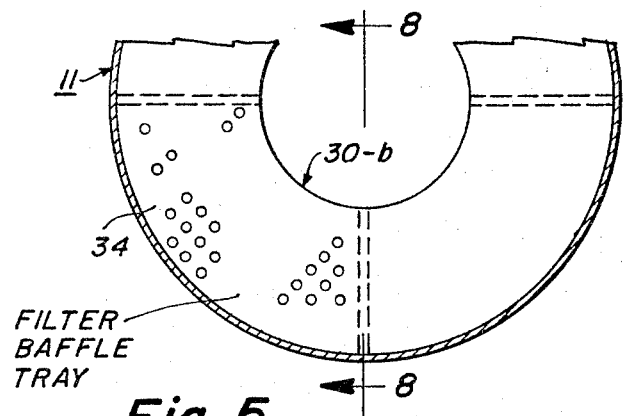
Fig 5.
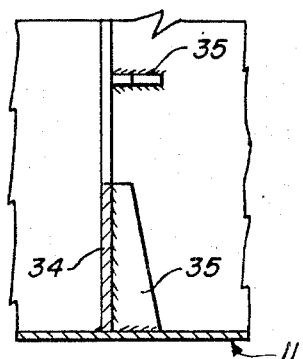
Fig. 8.
Fig. 7.
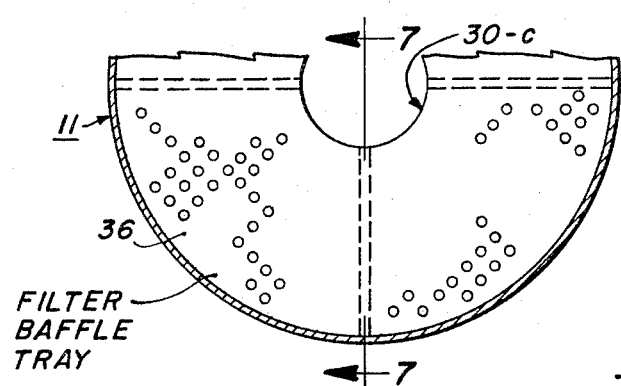
Fig. 4.
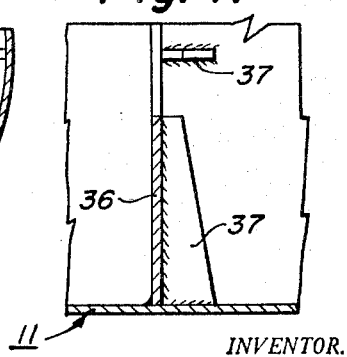
INVENTOR.
SIGMUND L. ROSS
BY Leonard L. Kalish
ATTORNEY.

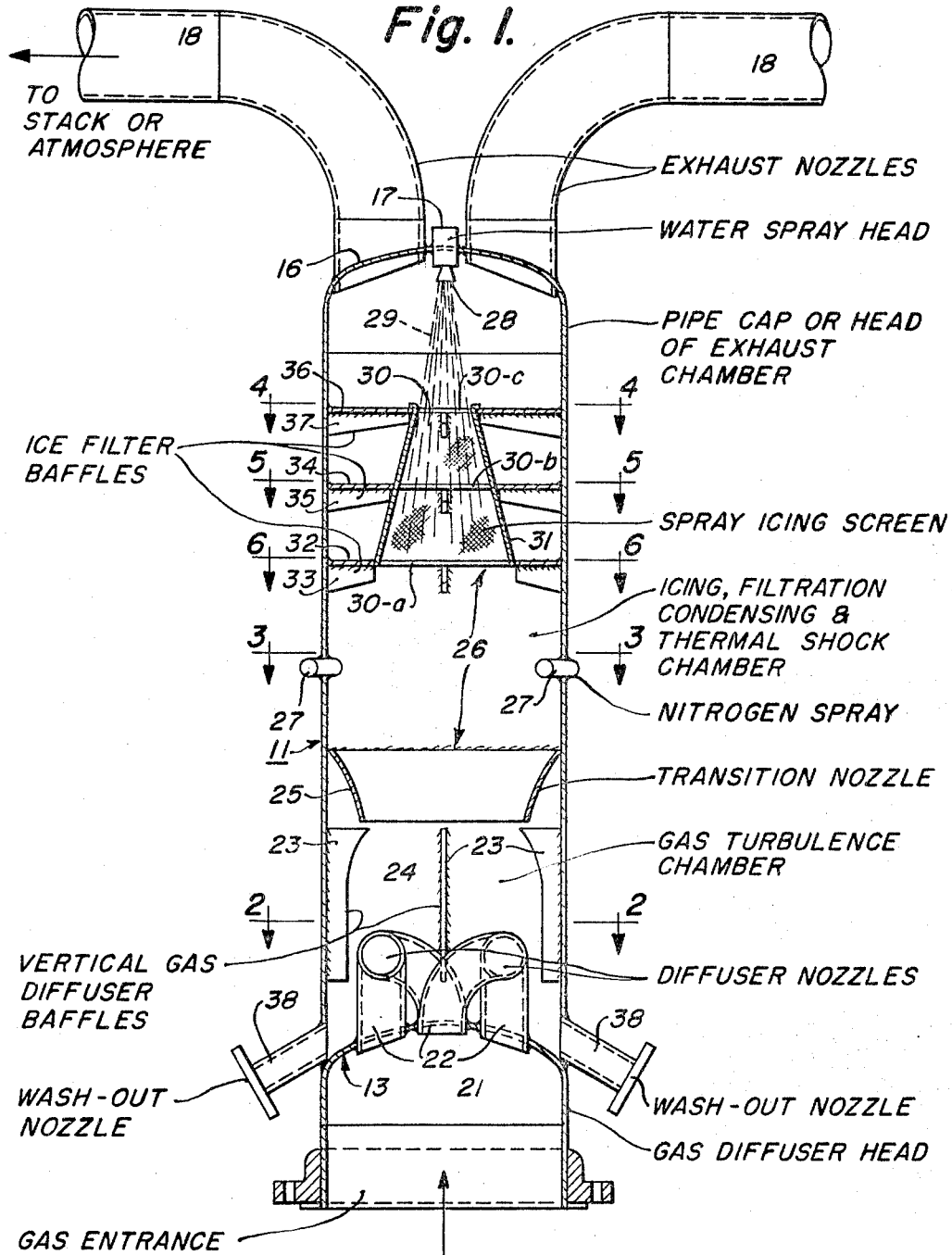

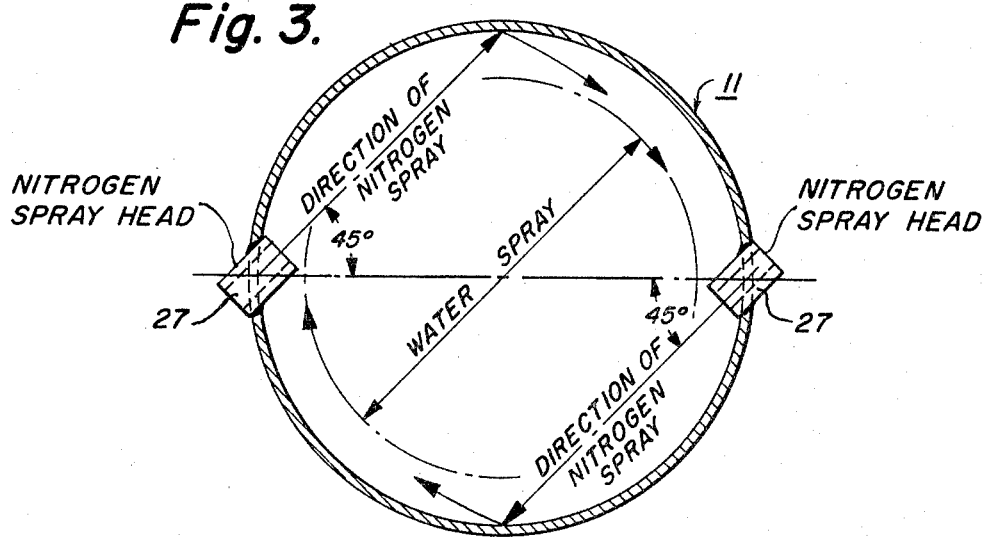
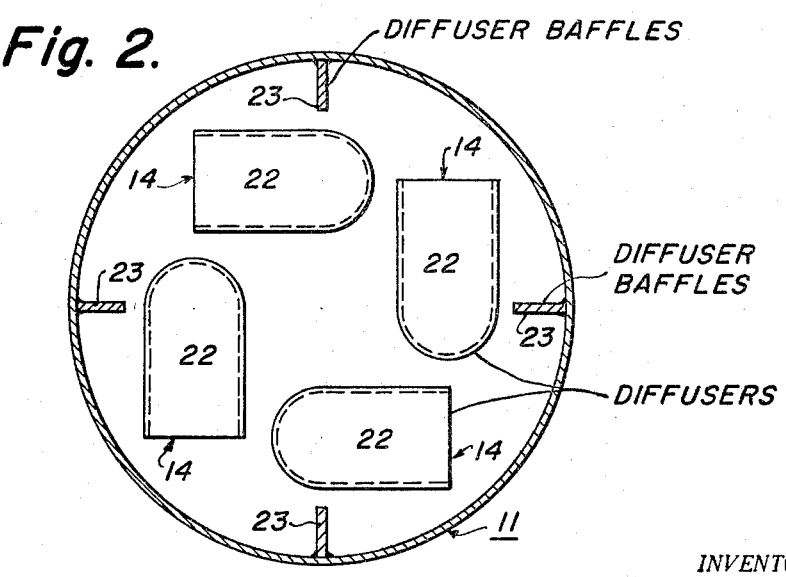

United States Patent Office 3,273,316
Patented Sept. 20, 1966

3,273,316
INDUSTRIAL WASTE GAS PURIFIER METHOD
Sigmund L. Ross, 2761 Sedgewick Ave.,
Bronx 68, N.Y.
Filed Feb. 3, 1964, Ser. No. 342,214
8 Claims. (Cl. 55—90)

The present invention relates to a method of purifying industrial waste gases in order to avoid poluting the atmosphere, by the removal therefrom of solid particles entrained in such gases and by the removal therefrom of gaseous portions or components thereof which are either condensable at low temperatures or which dissolve in water or combine with water.

The method of the present invention may also serve to recover reuseable ingredients of such waste gases.

The present invention involves, among other things, the sudden chilling or thermal shocking of the waste gases by means of liquid nitrogen or another liquified inert gas sprayed into an ascending stream of such waste gases rising against a descending water spray, and separating the ice crystals from the ascending stream of chilled waste gases and melting such ice crystals and draining out the water bearing the aforementioned impurities.

In one embodiment, the apparatus to perform the method of the present invention included a column into the lower end of which the waste gases are admitted, means for turbulating the ascending gases, a thermal shock chamber or chilling chamber thereabove, ice filter means above said chamber, tangential nitrogen inlets in said thermal shock chamber, water spraying means at the top of the column in operative juxtaposition to the ice filter means, washout means at or near the bottom of the column, and a gas discharge at or near the top of the column.

The present invention further may also include other features of the method which are disclosed hereinafter.

In the accompanying drawings in which like references characterize like parts,

FIGURE 1 represents a vertical cross-sectional view of an embodiment of the apparatus of the present invention.

FIGURE 2 represents a horizontal cross-sectional view generally on line 2—2 of FIGURE 1.

FIGURE 3 represents a horizontal cross-sectional view generally on line 3—3 of FIGURE 1, but on a larger scale, showing the disposition of the nitrogen spray heads.

FIGURE 4 represents a fragmentary horizontal cross-sectional view on line 4—4 of FIGURE 1, but on a larger scale.

FIGURE 5 represents a horizontal cross-sectional view on line 5—5 of FIGURE 1, on the same scale as FIGURE 4.

FIGURE 6 represents a fragmentary horizontal cross-sectional view on line 6—6 of FIGURE 1, on the same scale as FIGURES 4 and 5.

FIGURE 7 represents a fragmentary vertical cross-sectional view on line 7—7 of FIGURE 4.

FIGURE 8 represents a fragmentary vertical cross-sectional view on line 8—8 of FIGURE 5.

FIGURE 9 represents a fragmentary vertical cross-sectional view on line 9—9 of FIGURE 6.

In the illustrative embodiment thereof shown in the drawings, the apparatus of the present invention includes a vertical column generally in the form of a vertical cylinder designated generally by the numeral 11, which may be formed of suitable corrosion-resistant sheet-metal of adequate thickness, in the bottom of which a header chamber or inlet chamber 21 is provided. The waste gases may enter directly through the bottom of the column 11 as indicated by the arrows 12.

A plurality of gas distributors 22 extend from the upper wall 13 of the gas-inlet header chamber 21, and have their outlet ends 14 disposed generally tangentially as indicated in FIGURE 2, so as to cause the waste gases to be discharged generally tangentially and partly against the side-wall of the gas-turbulence chamber portion 24 of the column 11 and partly against the generally radially extending vertical baffles 23 carried by the sidewall of said turbulence chamber (as indicated in FIGURES 1 and 2), thereby to create substantial turbulence in the ascending stream of waste gases.

A generally annular nozzle-like member 25 is disposed above the turbulence chamber 24 with its small end facing downwardly and with its large end facing upwardly and secured to the sidewall of the column 11 as indicated in FIGURE 1, so that the turbulent gases rise upwardly through the nozzle-like member 25 and are conducted thereby into the chilling chamber or thermal shock chamber 26.

One or a plurality of tangentially disposed nitrogen inlets or nitrogen spray heads 27 extend through the sidewall of the column 11, in the zone of the shock chamber 26 thereof, as indicated in FIGURES 1 and 3. Liquid nitrogen is delivered through the nozzles 27 either in the form of jets but preferably in the form of sprays having considerable tangential velocity in relation to the generally circular horizontal cross-section of the thermal shock chamber 26.

A plurality of generally horizontal perforated ice filter baffle plates 32, 34 and 36 of generally annular shape and spaced one above the other, are disposed above the nitrogen chamber or thermal shock chamber 26, as shown in FIGURE 1 and in FIGURES 4 to 9. The perforated ice filter baffle plates 32, 34 and 36 have their outer peripheries welded or otherwise secured to the cylindrical sidewall of the column 11, and may also be supported by the vertical bracing web plates 33, 35 and 37, respectively, as shown in FIGURE 1 and in FIGURES 4 to 9; said web plates being welded to the lower surfaces of the respective ice filter baffle plates and to the sidewall of the column 11, as indicated in said figures.

The coaxial central holes 30–$a$, 30–$b$ and 30–$c$ in the respective ice filter baffle plates 32, 34 and 36, are of successively smaller diameters in an upward direction, so that the inner peripheries of these holes will define a truncated cone, as indicated in FIGURE 1.

To the inner peripheries of the coaxial holes 30–$a$, 30–$b$ and 30–$c$, a conical screen 31 is secured (by welding or by any other suitable means).

Through the upper wall 16 of the column 11 (or through the upper portion of the column 11) a water inlet 17 is provided, and to such water inlet a spray head 28 is operatively connected so as to deliver a generally conical water spray 29 in a downward direction generally to fill the upper opening 30–$c$ in the uppermost ice filter baffle plate 36, so that said spray will descend downwardly through the conical screen 31 and generally spread out as it moves downwardly through the screen 31 so as to distribute the spray water generally throughout the horizontal cross-section of said screen and thereafter further to spread out so as substantially to cover the horizontal cross-sectional area of the chilling chamber 26.

One or several gas outlets 18 extend from the upper portion of the column 11. The outlets 18 lead either to a stack and thence to the atmosphere or may lead directly to the atmosphere.

The sudden and very substantial lowering of the temperature due to the gasification and expansion of the liquid nitrogen in contact both with the descending water spray and the ascending waste gases, causes the formation of discreet ice particles from a portion of the spray water. A substantial portion of such ice crystals are entrained in and rise with the ascending gases and are filtered, separated or trapped by the baffle plates 32, 34 and 36, on the undersurfaces thereof. Some of the ice particles go through the perforations of the baffle plates and pack against the next baffle plate in gas penetrable or perforate formations, through whose interstices the gases may flow. As a consequence of the sudden and great drop in temperature, the energy level or energy content of the gaseous particles is greatly reduced, with a resultant lowering of the intensity of the magnetic fields of such gaseous particles and with a corresponding reduction of their attraction for each other.

As the waste gases rise and pass upwardly through the interstices of such ice crystal formations on the baffle plates, they give up some of their residual heat to the ice crystals. This, together with heat from the water spray, forms a thin film of water on the surfaces of the ice particles. Such water film has greater magnetic attraction for the chilled gas particles than they have for each other, so that the gas particles are brought into more intimate contact with such thin water films as they pass through these ice crystal formations; thereby enabling the water films both to collect the solid particles entrained in the waste gas and to absorb the cold-condensed and the water soluble and the water combinable gaseous portions of the waste gases. Such water film continuously drains through the ice formations and gravitates downwardly to the bottom of the column, as more ice crystals are deposited and more ice crystals are progressively melted to form a continuing supply of water films in replacement of the water films which have drained off.

The water spray 29 is provided by a water supply of sufficiently high pressure and of sufficiently high volume so that the entire conical interior of screen 31 is filled with water spray of such high velocity and high density that the upward passage of the much lower-pressured waste gases (and of the relatively low pressuer gaseous nitrogen) through the conical space within the screen 31 is barred by the descending high velocity and high density water spray. Hence, the ascending gases (waste gases and gaseous nitrogen) pass through the perforated baffle plates 32, 34 and 46 and exit through the outlets 18.

In this manner, the ice crystals entrained by the gases are separated by and collect against the surfaces of the perforated baffle plates 32, 34 and 36. The so collected ice crystals are in part melted by the heat supplied by the water spray 29 descending through the conical screen 31, so that the perforations in the plates 32, 34 and 36 are kept open or clear, for the continuous upward passage therethrough of the admixture of waste gases and gaseous nitrogen. However, depending upon the thermal balance between the temperature and the flow rate of the waste gases and the temperature and flow rate of the water spray and the amount of liquid nitrogen admitted, the rate of formation of the ice crystals may exceed its melting rate to such an extent that the holes or perforations in the plates 32, 34 and 36 may become completely plugged or substantially plugged, so as to either bar or substantially reduce the rate of flow of the admixture of waste gases and gaseous nitrogen through said plates. When this happens, then the liquid nitrogen is shut off or its rate-of-flow is reduced so as to reduce the rate of heat-removal due to the gasification and expansion of such nitrogen, until a sufficient proportion of the perforations in the plates 32, 34 and 36 are again opened up to permit an adequate upward rate-of-flow of said gases through said plates. Such shutting off or reduction of the flow rate of the nitrogen may be effected either manually or by any suitable conventional flow controllers responding either to the temperature or the pressure of the gas within the column 11 beneath said ice separator plates.

As the considerably higher pressure and velocity of the high density water spray 29 descending through the cone 31 bars the upward passage of the gases through such cone and as the water spray is maintained continuously, the excessive icing on the plates 32, 34 and 36 and the consequent partial or complete clogging of the holes or perforations thereof, merely has the effect of stopping the flow of the waste gas through the apparatus or reducing its flow therethrough. This in turn causes a slight rise in pressure of the gas beneath the bottommost ice separator plate and also causes corresponding lowering of temperature, and either such pressure rise or temperature drop may be used to cause any conventional flow contoller to either reduce the rate-of-flow of the liquid nitrogen being admitted or to shut it off entirely, until such pressure or temperature condition returns to the selected operating range which will keep the perforations of the plates open to a sufficient extent.

The ice particles, entrained by the ascending admixture of waste gases and gaseous nitrogen pass through the perforations of the successive plates. Such of the so ascending ice particles which rise above the uppermost plate 36 are either melted and brought down again through the plates or are entrained by the descending water spray 29. Such of the ice particles as accumulate on the plates and in the perforations thereof, serve as a gas filter to which the solid particles entrained in the gas are adhered (to be washed down later with the melt).

While in the embodiment of the invention shown in the accompanying drawings, the inner peripheries of the annular (perforated) baffle plates 32, 34 and 36 generally define a cone, the diameters of such inner peripheries may also be generally equal, so as to define a generally cylindrical form therewithin. In the latter case, the high density, high velocity water spray 29 (from the high pressure, high volume water supply) will also be generally cylindrical, so as to fill the cylinder so defined by the inner peripheries of said baffle plates or by the screen 31 (which would then likewise be generally cylindrical). In such case, the spray head 28 would be of sufficiently larger size and would have its multiple orifices directed downwardly in more or less parallel paths and spaced sufficiently close to each other so as to provide a high density, high velocity spray of generally cylindrical cross-section and of a diameter to fill the cross-section of such cylindrical screen 31 or space.

Having shown and described an illustrative embodiment of my invention, I claim the following:

1. The method of purifying industrial waste gases which includes flowing such waste gases upwardly, spraying water downwardly, gasifying liquid nitrogen in contact with said water spray and expanding the so gasified nitrogen to form ice crystals from a portion of said water spray, separating said ice crystals from the ascending gases and moving the ascending gases in contact with masses of such separated ice crystals, draining and removing the melt from such ice crystals and the portion of said water spray which has not been converted into ice crystals, and exhausting the resultant gases.

2. A method according to claim 1, wherein the water spray is of sufficient velocity and density in relation to the velocity and pressure of the ascending gases as substantially to bar the upward passage of such ascending gases through the main body of the descending water spray and to cause the ascending gases to flow in a path generally separate and distinct from the path of said spray.

3. A method according to claim 2, in which the horizontal cross-sectional area of the water spray increases and its density decreases in a downward direction.

4. A method according to claim 1, in which the liquid nitrogen is gasified and expanded in contact with the water spray and in contact with the ascendling waste gases.

5. A method according to claim 1, in which the horizontal cross-sectional area of the water spray increases and its density decreases in a downward direction.

6. A method according to claim 1, in which the ascending gases are moved through interstices within the masses of the separated ice crystals.

7. The method of purifying industrial waste gases which includes causing such gases to rise upwardly under the influence of relatively low gas pressure and spraying high-pressure water downwardly at a high velocity and high density so as to cause said ascending gases to rise adjacently past and not substantially through said descending water spray, injecting liquid nitrogen into the countermoving streams of ascending gases and descending water spray and gasifying and expanding such nitrogen in contact with said spray so as substantially to reduce the temperature thereof and to cause the formation of ice crystals and to cause a substantial portion of such ice crystals to be entrained by the ascending gases, separating such ice crystals from the ascending stream of gases in a zone adjacent the high density descending water spray, progressively melting the separated ice crystals and flowing the melt thereof downwardly to a zone substantially below the aforementioned nitrogen injection zone, and draining from such a lower zone the aforesaid melt and the portion of the water spray which was not converted into ice crystals.

8. The method of purifying industrial waste gases which includes causing such gases to rise upwardly under the influence of relatively low gas pressure, and spraying high pressure water downwardly at a high velocity in a cone shaped spray of high density through a portion of the horizontal cross-sectional area of the ascending gases, so as to cause said ascending gases to rise adjacently past but not through said descending water spray except in a lower intersperse zone in which the conical water spray has spread out sufficiently so that its density has thereby been reduced sufficiently to permit both the ascending low pressure gas and the descending high velocity spray to occupy the same zone and to be interspersed with each other, injecting liquid nitrogen into the countermoving streams of ascending gases and descending water spray in the aforementioned intersperse zone common to both, and expanding and gasifying such nitrogen in said intersperse zone so as substantially to reduce the temperature thereof, to cause the formation of ice crystals in said common intersperse zone and to cause a substantial portion of such crystals to be entrained by the ascending gases, filtering such ice crystals from the ascending stream of gases in a zone adjacent the righ density zone of the descending high velocity water spray, melting the filtered ice crystals and flowing the melt thereof downwardly to a zone substantially below the aforementioned common intersperse and nitrogen injection zone, and draining from such a lower zone the aforesaid melt as well as the portion of the water spray which passes through the nitrogen injection zone without being converted into ice crystals, with solid particles originally entrained in said waste gases and with condensable, water soluble and water combinable components of said original waste gases being withdrawn with said drainage.

References Cited by the Examiner

UNITED STATES PATENTS

| 1,732,086 | 10/1929 | Flipper | 55—259 |
| 2,601,298 | 6/1952 | Keith | 55—80 |

FOREIGN PATENTS

| 617,885 | 4/1961 | Canada. |
| 673,492 | 6/1952 | Great Britain. |

REUBEN FRIEDMAN, *Primary Examiner.*

J. ADEE, *Assistant Examiner.*